United States Patent
Kim et al.

(10) Patent No.: US 8,639,021 B2
(45) Date of Patent: Jan. 28, 2014

(54) APPARATUS AND METHOD WITH COMPOSITE SENSOR CALIBRATION

(75) Inventors: Dong-Jo Kim, Hwaseong-si (KR);
Dong-Ryeol Park, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 395 days.

(21) Appl. No.: 12/926,744

(22) Filed: Dec. 7, 2010

(65) Prior Publication Data
US 2011/0182476 A1    Jul. 28, 2011

(30) Foreign Application Priority Data
Jan. 27, 2010  (KR) .................. 10-2010-0007538

(51) Int. Cl.
*G06K 9/00*    (2006.01)

(52) U.S. Cl.
USPC .......................................... 382/154; 382/106

(58) Field of Classification Search
None
See application file for complete search history.

(56) References Cited

U.S. PATENT DOCUMENTS

| | | | |
|---|---|---|---|
| 7,373,270 B2 | 5/2008 | Ohashi et al. | |
| 2009/0125175 A1 | 5/2009 | Park et al. | |
| 2010/0004861 A1* | 1/2010 | Park et al. | 701/301 |

FOREIGN PATENT DOCUMENTS

| | | |
|---|---|---|
| JP | 08-210816 | 8/1996 |
| JP | 2004-306249 | 11/2004 |
| KR | 10-2008-0091891 | 10/2008 |
| KR | 10-2009-0025822 | 3/2009 |
| KR | 10-2009-0048104 | 5/2009 |

OTHER PUBLICATIONS

Stamos et al., "3-D Model Construction Using Range and Image Data", Jun. 15, 2000, IEEE Conference on Computer Vision and Pattern Recognition Proceedings, vol. 1, p. 531-536.*

* cited by examiner

*Primary Examiner* — Stephen R Koziol
*Assistant Examiner* — Timothy Choi
(74) *Attorney, Agent, or Firm* — Staas & Halsey LLP (57) ABSTRACT

An apparatus and method capable of calculating a coordinate transformation parameter without having to utilize a rig are provided. The apparatus and method extract a first feature point based on a plane of first data, project the first feature point onto second data and then extract a second feature point from a part of the second data onto which the first feature point is projected. Then, calibration is performed based on the extracted feature points. Therefore, it is possible to perform calibration immediately as necessary without having to utilize a separate device such as a rig.

20 Claims, 12 Drawing Sheets

APPARATUS AND METHOD WITH COMPOSITE SENSOR CALIBRATION

CROSS-REFERENCE TO RELATED APPLICATIONS

This application claims the benefit under 35 U.S.C. §119(a) of a Korean Patent Application No. 10-2010-0007538, filed on Jan. 27, 2010, the entire disclosure of which is incorporated herein by reference for all purposes.

BACKGROUND

1. Field

One or more embodiments relate to a sensor calibration technique for accurately combining data acquired from different kinds of sensors.

2. Description of the Related Art

The term robot traditionally referred to an automated "doll" in which a mechanical device is assembled inside a human-shaped doll so that hands, feet and other parts operate similarly to a human being. However, this definition has recently been expanded to refer to an automatic device which autonomously performs tasks regardless of whether it looks like a human being.

In particular, mobile robots are noted for their ability to perform tasks in extreme circumstances or risky places in place of a human being. Home service robots such as a cleaning robot that help with housework while traveling autonomously in a house are also being popularized.

In order for a mobile robot to perform tasks while autonomously moving in a specific space, a localization technique is desirable. In order for a mobile robot to recognize its location, it may acquire information about an ambient environment using sensors. Recently, a technique of acquiring information about an ambient environment using a composite sensor made up of different kinds of sensors has also been used.

In order to accurately combine data obtained from different kinds of sensors, calibration is needed. Calibration is performed to match a center coordinate of a certain sensor to a center coordinate of another sensor. Representative calibration is performed by placing a rig with a lattice pattern at a specific distance and making different kinds of sensor acquire information about the rig.

SUMMARY

In one general aspect, there is provided an apparatus with composite sensor calibration, including a plane extractor to extract at least one plane from first data obtained by a first sensor, a first feature point extractor to extract a first feature point from the first data based on the at least one plane, a second feature point extractor to project the first feature point onto second data obtained by a second sensor and to extract a second feature point corresponding to the first feature point from a part of the second data onto which the first feature point is projected, and a transformation parameter calculator to calculate a coordinate transformation parameter between the first sensor and the second sensor using the first feature point and the second feature point.

In another general aspect, there is provided an apparatus with composite sensor calibration, including a plane extractor to extract at least one plane from first data obtained by a first sensor, a first feature point extractor to extract a first feature point from the first data based on the at least one plane, a first line extractor to extract a first line from the first data based on the at least one plane, a second line extractor to project the first line onto second data obtained by a second sensor and to extract a second line corresponding to the first line from a part of the second data onto which the first line is projected, a second feature point extractor to extract a second feature point corresponding to the first feature point based on the second line, and a transformation parameter calculator to calculate a coordinate transformation parameter between the first sensor and the second sensor using the first feature point and the second feature point.

In another general aspect, there is provided a method with composite sensor calibration, including extracting at least one plane from range data obtained by the distance sensor, extracting a first feature point from the range data based on the at least one plane, projecting the first feature point onto image data obtained by the image sensor, and extracting a second feature point corresponding to the first feature point from a part of the image data onto which the first feature point is projected, and calculating a coordinate transformation parameter between the first sensor and the second sensor using the first feature point and the second feature point.

In another general aspect, there is provided a method with composite sensor calibration, including extracting at least one plane from range data obtained by the distance sensor, extracting a first feature point from the range data based on the at least one plane, extracting a first line from the range data based on the at least one plane, projecting the first line onto image data obtained by the image sensor, and extracting a second line corresponding to the first line from a part of the image data onto which the first line is projected, extracting a second feature point corresponding to the first feature point based on the second line, and calculating a coordinate transformation parameter between the distance sensor and the image sensor using the first feature point and the second feature point.

The first line may be extracted based on a part of the first data along which two planes cross each other from range data, and the first feature point may be extracted based on a part of the first data at which three planes cross each other from range data.

The coordinate transformation calculator may register the first feature point and the second feature point when a difference between coordinate values of the first and second feature points is equal to or less than a first threshold value, and calculate, when the number of the registered first and second feature points is equal to or greater than a second threshold value, the coordinate transformation parameter using the registered first and second feature points.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 1:
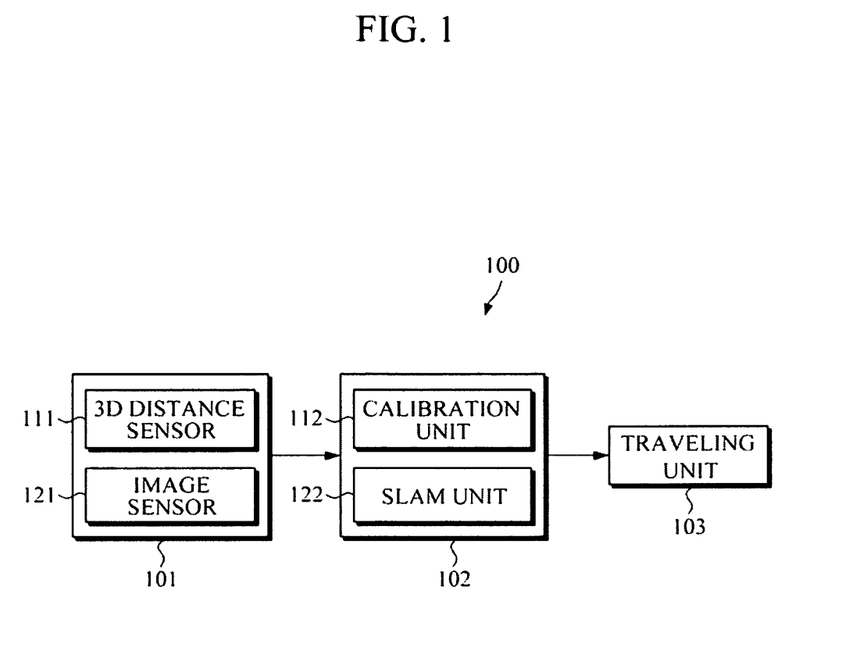
FIG. 1 is a diagram illustrating a robot, according to one or more embodiments.

FIG. 1 is a diagram illustrating a robot 100, according to one or more embodiments.

Referring to FIG. 1, the robot 100 may include a sensor unit 101, a location recognizer 102, and a travelling unit 103, for example.

The sensor unit 101 may detect environmental information. The sensor unit 101 may be a composite sensor consisting of different kinds of sensors. The sensor unit 101 may include a 3-dimensional (3D) distance sensor 111 and an image sensor 121, as only examples.

The 3D distance sensor 111 may measure a distance to a peripheral object(s) to acquire range data. The range data may be an image whose color, chroma or brightness is represented depending on distance. For example, the 3D distance sensor 111 may emit light to an object to be measured from different locations, detect light reflected from the object, and then measure a 3D distance to the object according to trigonometry based on a time difference between the time of the light emission and the time of the light detection and a distance difference between the location of the light emission and the location of the light detection.

The image sensor 121 may photograph a peripheral environment to acquire image data. The image sensor 121 may be a Charged Coupled Device (CCD) or Complementary Metal Oxide Semiconductor (CMOS), as only examples, that senses incident light and generates an image signal corresponding to the sensed light.

The location recognizer 102 may recognize a location of the robot 100 based on information about the peripheral environment acquired by the sensor unit 101. The location recognizer 102 may include a calibration unit 112 and a simultaneous localization and mapping (SLAM) unit 122, for example.

The calibration unit 112 may match reference coordinates of the 3D distance sensor 111 to reference coordinates of the image sensor 121. For example, the calibration unit 112 may detect to which parts of image data individual points of range data correspond, and calculate a coordinate transformation parameter between a coordinate system of the 3D distance sensor 111 and a coordinate system of the image sensor 121 based on the results of the detection.

The SLAM unit 121 may recognize a location of the robot 100 and simultaneously draws up a map using the range data and image data with the matched reference coordinates. As only an example, the SLAM unit 121 may recognize a location of the robot 100 while drawing up a map using a SLAM method based on Extended Kalman Filter (EKF).

The traveling unit 103 may enable the robot 100 to travel in an appropriate way based on the results of environmental recognition of the location recognizer 102. For example, the travelling unit 103 may supply power to the robot 100 and be composed of wheels, a direction controller, a driving motor, etc.

Figure 2:
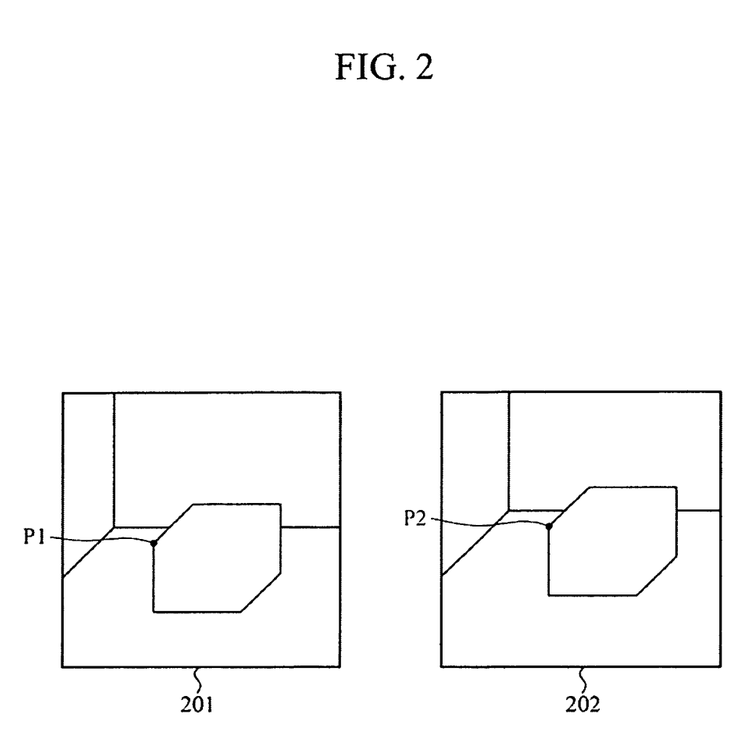
FIG. 2 is a view for explaining a concept of calibration, according to one or more embodiments.

FIG. 2 is a view for explaining a concept of calibration, according to one or more embodiments.

Referring to FIGS. 1 and 2, the reference number 201 of FIG. 2 may represent range data acquired by the 3D distance sensor 111 and the reference number 202 of FIG. 2 may represent image data acquired by the image sensor 121.

Since the 3D distance sensor 111 is spaced a predetermined distance from the image sensor 121, and the coordinate systems of the 3D distance sensor 111 and the image sensor 121 are also different from each other, the 3D distance sensor 111 and the image sensor 121 may represent one location as different coordinates. For example, a location of one object may be respectively represented as different coordinate values P1 and P2 in range data 201 and image data 202.

Calibration is a process of obtaining a coordinate transformation parameter for matching different P1 and P2 coordinate values. For example, the 3D distance sensor 111 may be calibrated to the image sensor 121 by obtaining a rotational-translational transformation value R and a parallel-translational value T in order to match a P1 coordinate value to a P2 coordinate value. For example, P1 may be determined to be equal to R·P2+T.

Figure 3:
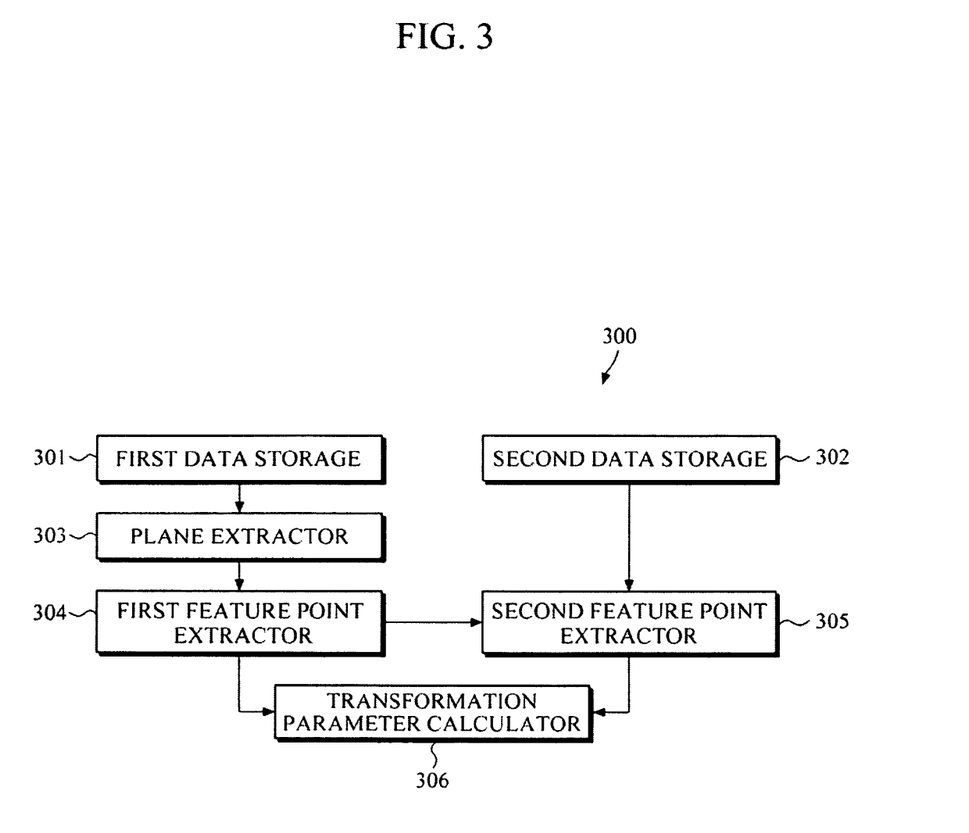
FIG. 3 is a diagram illustrating a calibration apparatus, according to one or more embodiments.

FIG. 3 is a diagram illustrating a calibration apparatus 300, according to one or more embodiments.

Referring to FIG. 3, the calibration apparatus 300 may include a first data storage 301, a second data storage 302, a plane extractor 303, a first feature point extractor 304, a second feature point extractor 305, and a transformation parameter calculator 306, for example. The calibration apparatus 300 may be included in an apparatus with composite sensor calibration that is a robot, such as shown in FIG. 1.

The first data storage 301 may receive first data from a first sensor. For example, the first data storage 301 may receive range data from the 3D distance sensor 111 (see FIG. 1) and store the range data. The first data storage 301 may be a buffer memory which stores range data in units of predetermined frames.

The second data storage 302 may receive second data from a second sensor which is different from the first sensor. For example, the second data storage 302 may receive image data from the image sensor 121 and store the image data. The second data storage 302 may be a buffer memory which stores image data in units of predetermined frames.

The plane extractor 303 may extract a plurality of planes from the first data. For example, the plane extractor 303 may apply a plane detection algorithm to the range data, thus extracting a plurality of planes.

The first feature point extractor 304 may extract a first feature point from the first data. The first feature point may be a candidate feature point to be subject to calibration, like the coordinate value P1 of FIG. 2. The first feature point extractor 304 may extract the first feature point using the planes extracted by the plane extractor 303. For example, the first feature extractor 304 may extract a point at which three planes cross each other as a first feature point.

The second feature extractor 305 may extract a second feature point corresponding to the first feature point from the second data. The second feature point may be a candidate feature point to be subject to calibration, like coordinate value P2 of FIG. 2. The second feature point extractor 305 may project the first feature point onto the second data and apply a corner detection algorithm to a location onto which the first feature point is projected, thus extracting a second feature point.

The transformation parameter calculator 306 may calculate a coordinate transformation parameter between the first and second sensors using the first feature point of the first data and the second feature point of the second data.

The transformation parameter calculator 306 may register a plurality of first and second feature points and obtain a coordinate transformation parameter using the registered first and second feature points. For example, the transformation parameter calculator 360 may compare a coordinate value of the extracted first feature point to a coordinate value of the extracted second feature point, and register the first and second feature points when a difference between the coordinate values of the first and second feature points is equal to or less than a first threshold value. When the number of registered feature points is equal to or greater than a second threshold value, the aforementioned R and T variables may be obtained by rewriting the aforementioned example equation of P1=R·P2+T, into a matrix equation and then solving the matrix equation.

Figure 4:
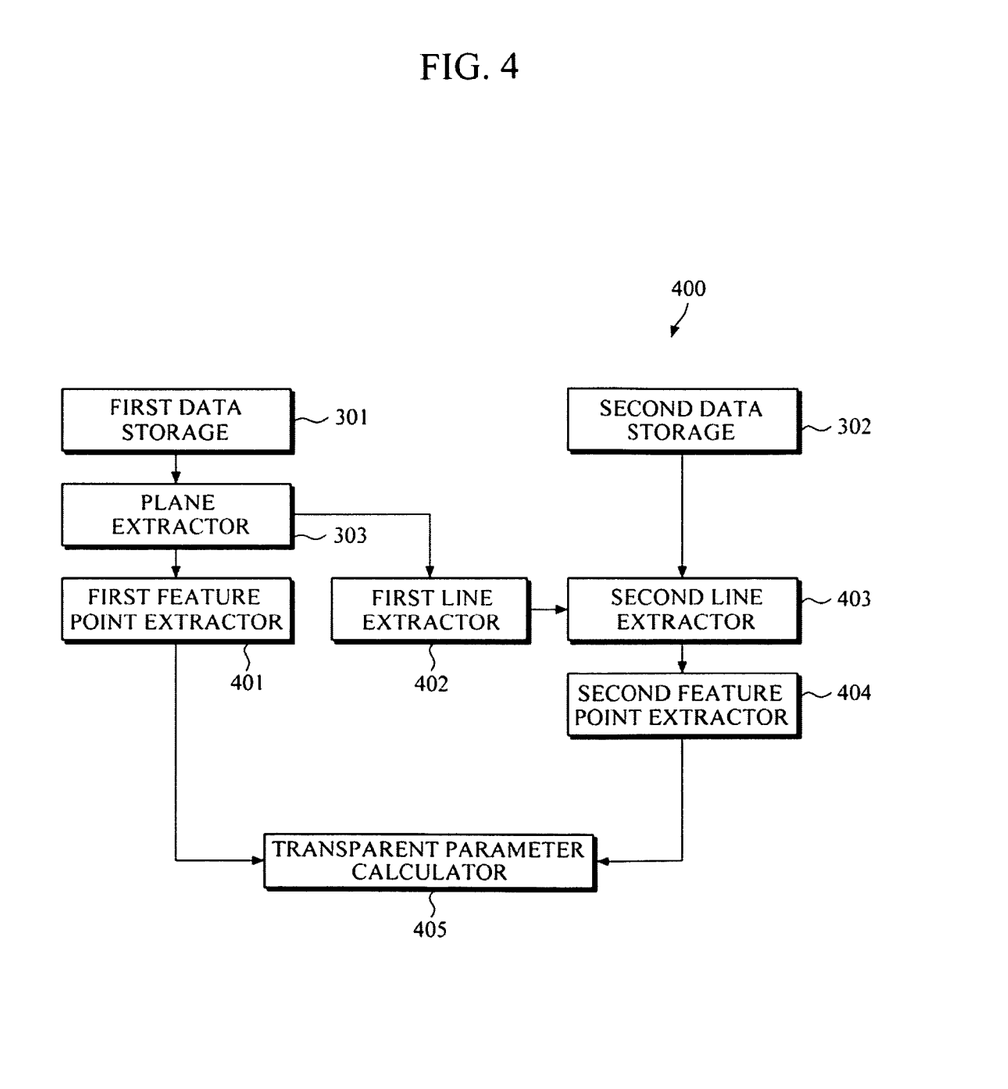
FIG. 4 is a diagram illustrating another calibration apparatus, according to one or more embodiments.

FIG. 4 is a diagram illustrating another calibration apparatus 400, according to one or more embodiments.

Referring to FIG. 4, the calibration apparatus 400 may include a first data storage 301, a second data storage 302, a plane extractor 303, a first feature point extractor 401, a first line extractor 402, a second line extractor 403, a second feature point extractor 404, and a transformation parameter calculator 405, for example.

The first data storage 301, the second data storage 302 and the plane extractor 303 respectively correspond to similar elements with like reference numbers described above with reference to FIG. 3. The first feature point extractor 401 may also extract a first feature point from range data using at least three planes among planes extracted by the plane extractor 303.

The first line extractor 402 may extract a first line based on a plane of the first data extracted by the plane extractor 303. For example, the first line extractor 402 may extract a line along which two planes cross each other as a first line.

The second line extractor 403 may extract a second line corresponding to the first line from second data. For example, the second line extractor 403 may project the extracted first line onto second data and apply a line detection algorithm to a part onto which the first line is projected, thus extracting a second line.

The second feature point extractor 404 may extract a second feature point corresponding to the first feature point. For example, the second feature point extractor 404 may extract a location at which at least three second lines cross each other as a second feature point.

The transformation parameter calculator 405 may calculate a coordinate transformation parameter for calibration using the extracted first and second feature points. For example, the transformation parameter calculator 405 may compare a coordinate value of the extracted first feature point to a coordinate value of the extracted second feature point and register the extracted first and second feature points when a difference between the coordinate values of the first and second feature points is equal to or less than a first threshold value. When the number of registered feature points is equal to or greater than a second threshold value, the aforementioned R and T variables may be obtained by rewriting the aforementioned example equation of P1=R·P2+T, into a matrix equation and then solving the matrix equation.

FIGS. 5A through 5F illustrate range data and image data, according to one or more embodiments.

Figure 5A:
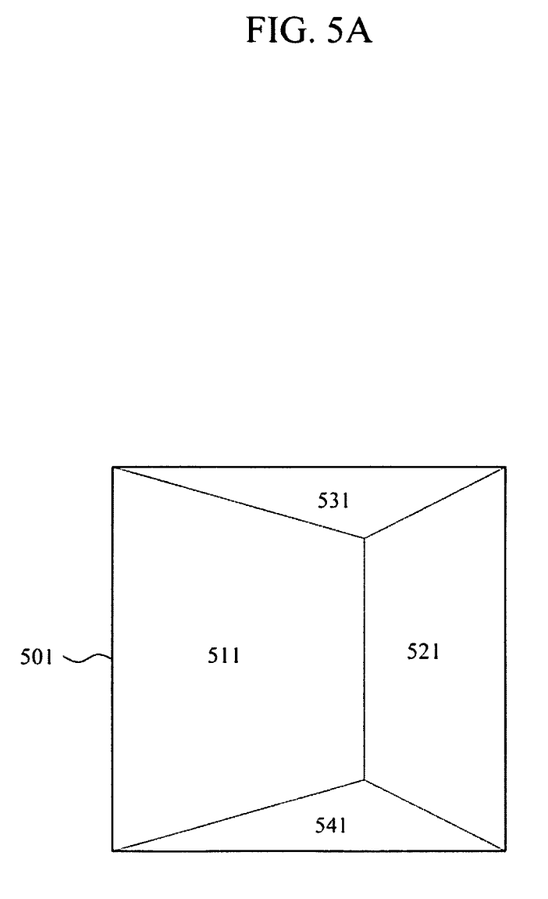
FIGS. 5A through 5F illustrate range data and image data, according to one or more embodiments.

Referring to FIG. 5A, the plane extractor 303 may extract planes 511, 521, 531, and 541 from range data 501 stored in the first data storage unit 301 (see FIG. 3).

Figure 5B:
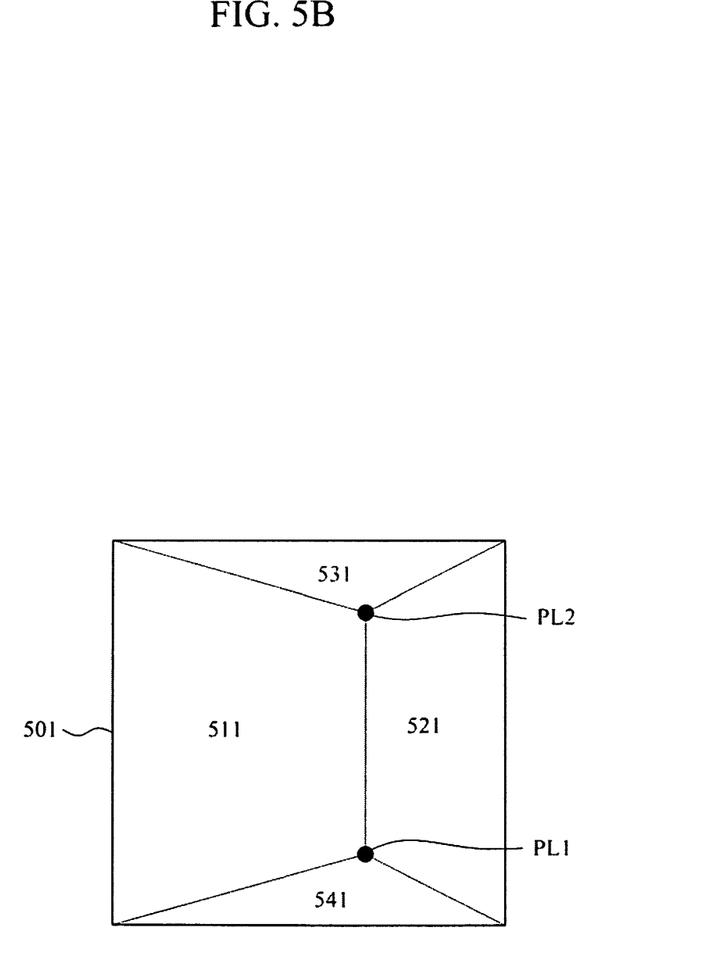

Referring to FIG. 5B, the first feature point extractor 401 may extract first feature points PL1 and PL2 based on the extracted planes 511, 521, 531, and 541. For example, a point at which the planes 511, 541, and 521 intersect may be extracted as PL1 and a point at which the planes 511, 531, and 521 intersect may be extracted as PL2.

Figure 5C:
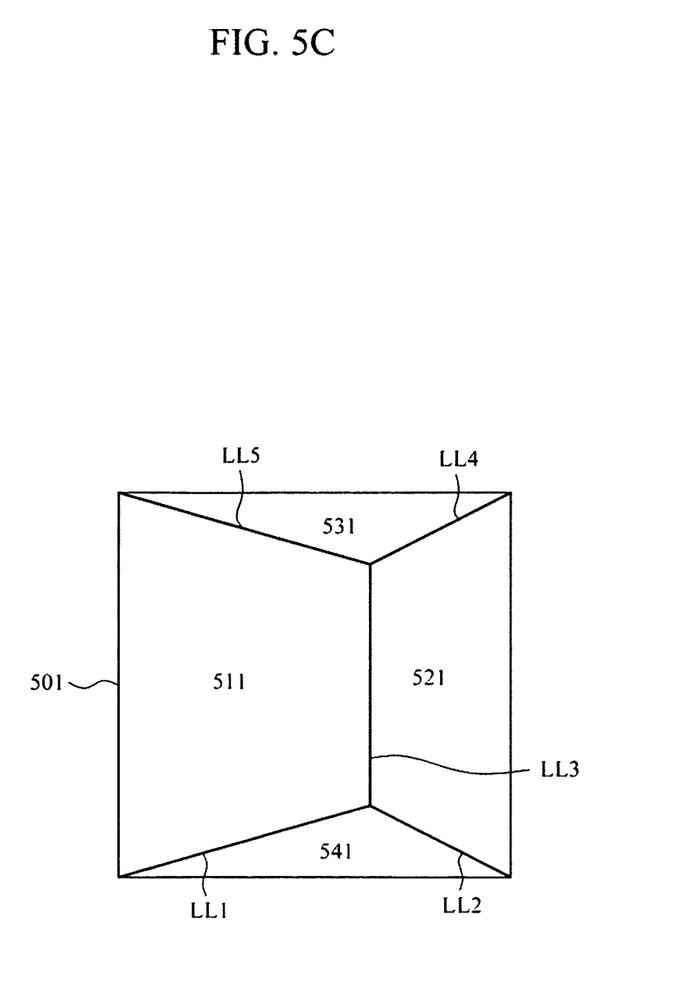

Referring to FIG. 5C, the first line extractor 402 may extract first lines LL1, LL2, LL3, LL4, and LL5 based on the extracted planes 511, 521, 531, and 541. For example, the first line extractor 402 may extract a line along which the plane 511 crosses the plane 541 as a line LL1, a line along which the plane 541 crosses the plane 521 as a line LL2, a line along which the plane 511 crosses the plane 521 as a line LL3, a line along which the plane 531 crosses the plane 521 as a line LL4, and a line along which the plane 531 crosses the plane 511 as a line LL5.

Figure 5D:
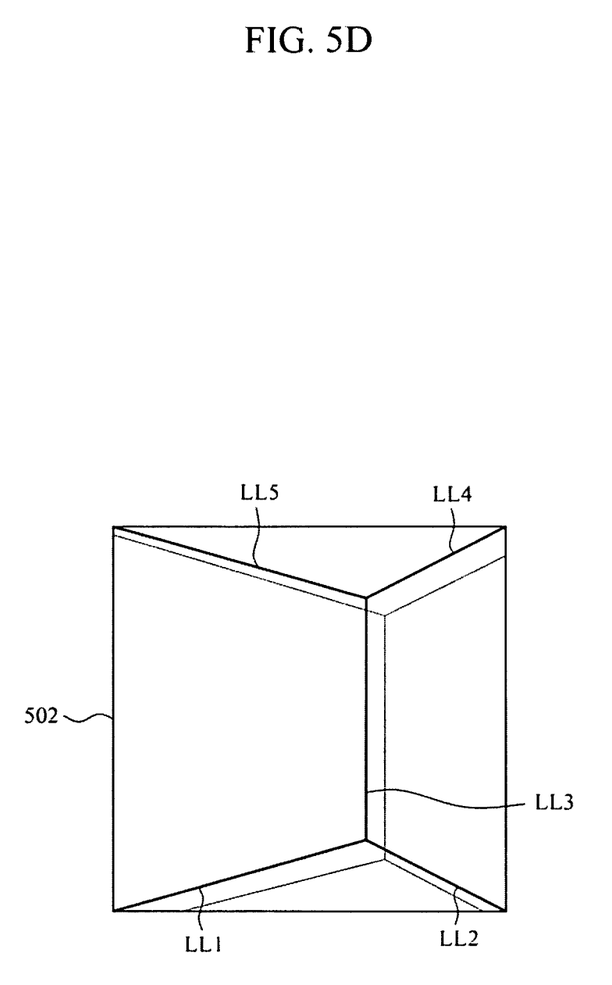

Referring to FIG. 5D, the second line extractor 403 may project the first lines LL1, LL2, LL3, LL4, and LL5 onto image data 502 stored in the second data storage 302.

Figure 5E:
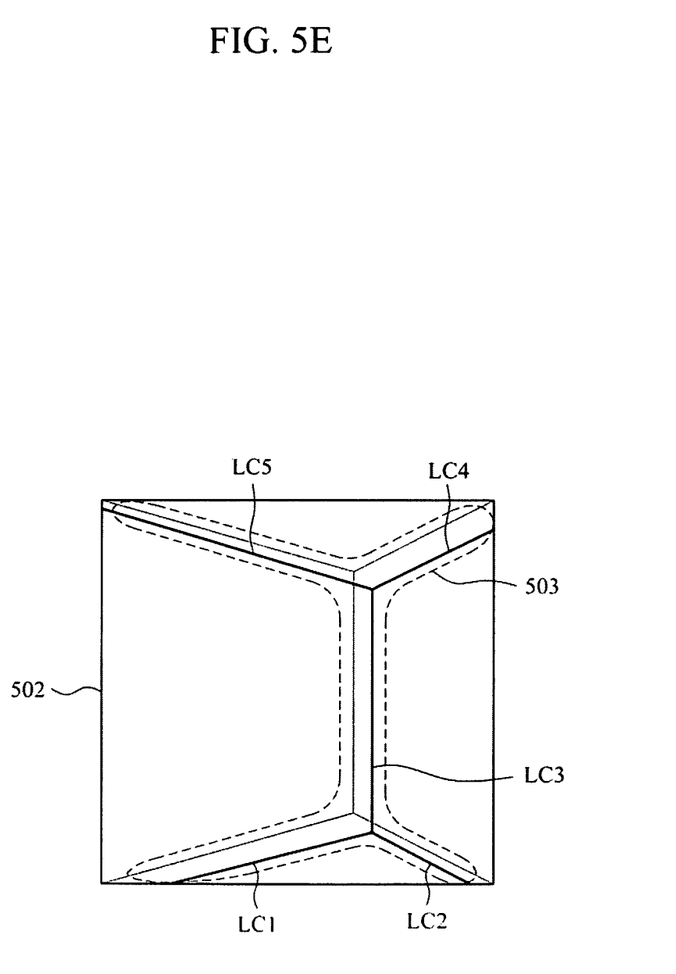

Referring to FIG. 5E, the second line extractor 403 may extract second lines LC1, LC2, LC3, LC4, and LC5 of image data 502 from a part 503 onto which the first lines LL1, LL2, LL3, LL4, and LL5 are projected.

Figure 5F:
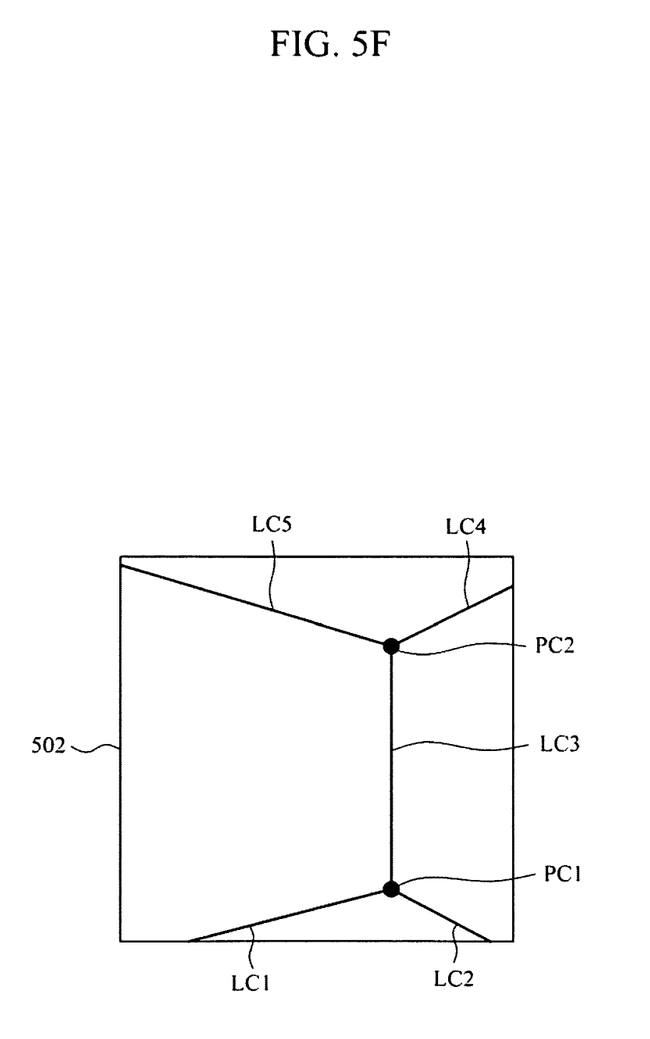

Referring to FIG. 5F, the second feature point extractor 404 may extract second feature points PC1 and PC2 using the second lines LC1, LC2, LC3, LC4, and LC5. For example, the second feature point extractor 404 may extract a point at which the lines LC1, LC2, and LC3 cross each other as PC1 and a point at which the lines LC3, LC4, and LC5 cross each other as PC2.

Referring to FIGS. 5B and 5F, the transformation parameter calculator 405 may calculate a coordinate parameter for calibration using the first feature points PL1 and PL2 and the second feature points PC1 and PC2.

FIGS. 5A through 5F show an example where predetermined lines are projected and second feature points corresponding to first feature points are obtained based on the projected lines. However, the embodiments are not limited to this example. For example, the second feature points PC1 and PC2 may be extracted by projecting the extracted first feature points PL1 and PL2 onto image data 502 and then applying a corner detection algorithm to a part onto which the first feature points PL1 and PL2 are projected, with alternate embodiments being equally available.

Figure 6:
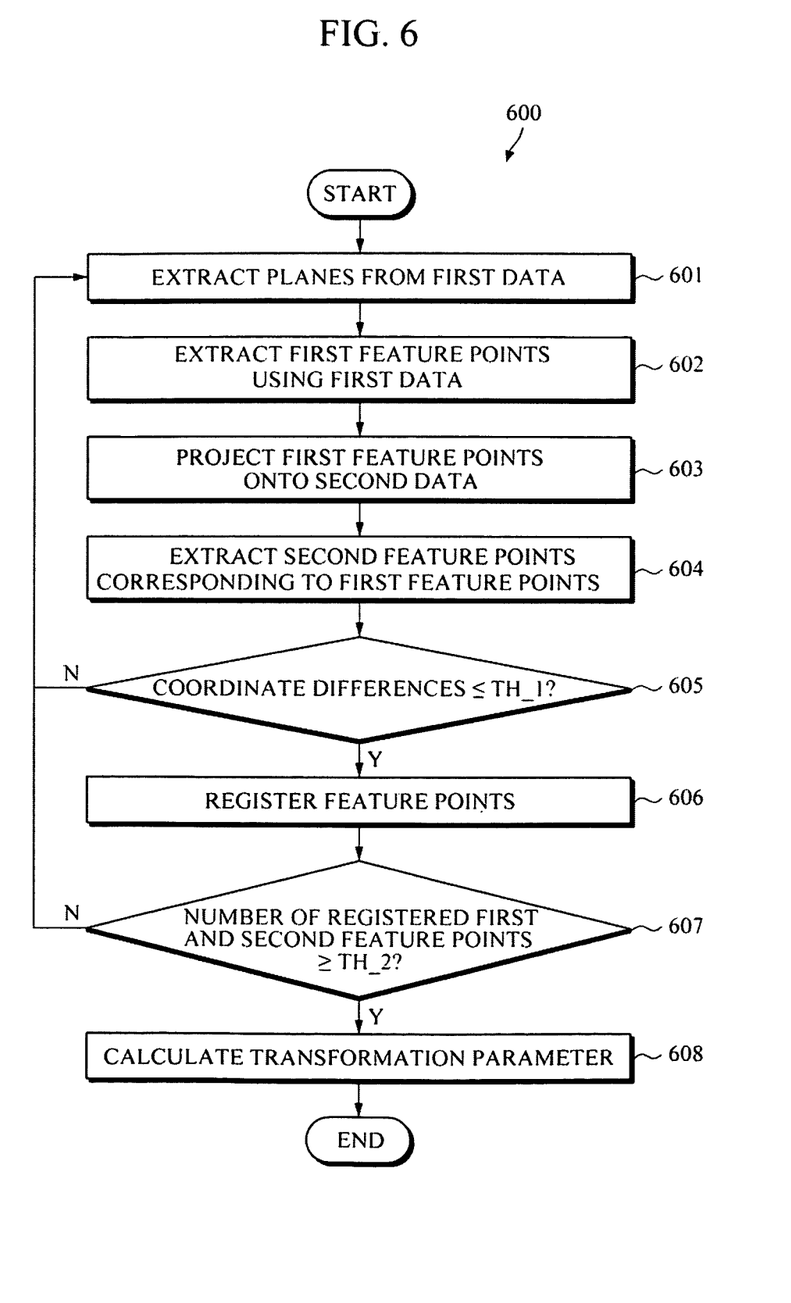
FIG. 6 is a flowchart illustrating a method with calibration, according to one or more embodiments.

FIG. 6 is a flowchart illustrating a method 600 with calibration, according to one or more embodiments.

Referring to FIG. 6, planes may be extracted from the first data (601). For example, the plane extractor 303 may apply a plane detection algorithm to range data, thus extracting a plurality of planes.

Then, a plurality of first feature points may be extracted using the extracted planes (602). For example, the first feature point extractor 304 may extract points at which three planes cross each other as first feature points.

Successively, the first feature points may be projected onto second data (603). For example, the second feature point extractor 305 may project first feature points of range data onto image data.

Next, a corner detection algorithm may be applied onto a part of the second data to which the first feature points are projected, thus extracting second feature points corresponding to the first feature points (604).

Then, coordinate values of the first feature points may be compared to coordinate values of the second feature points (605). When it is determined from the results of the comparison that differences between the coordinate values of the first and second feature points are equal to or less than a first threshold value, such as the illustrated TH_1 threshold, the extracted first and second feature points may be registered (606).

Then, it may be determined whether the number of the registered first and second feature points is equal to or greater than a second threshold value (607), such as the illustrated TH_2 threshold. When it is determined from the results of the determination that the number of the first and second feature points is equal to or greater than the second threshold value, a coordinate transformation parameter may be calculated using the registered first and second feature points (608).

Figure 7:
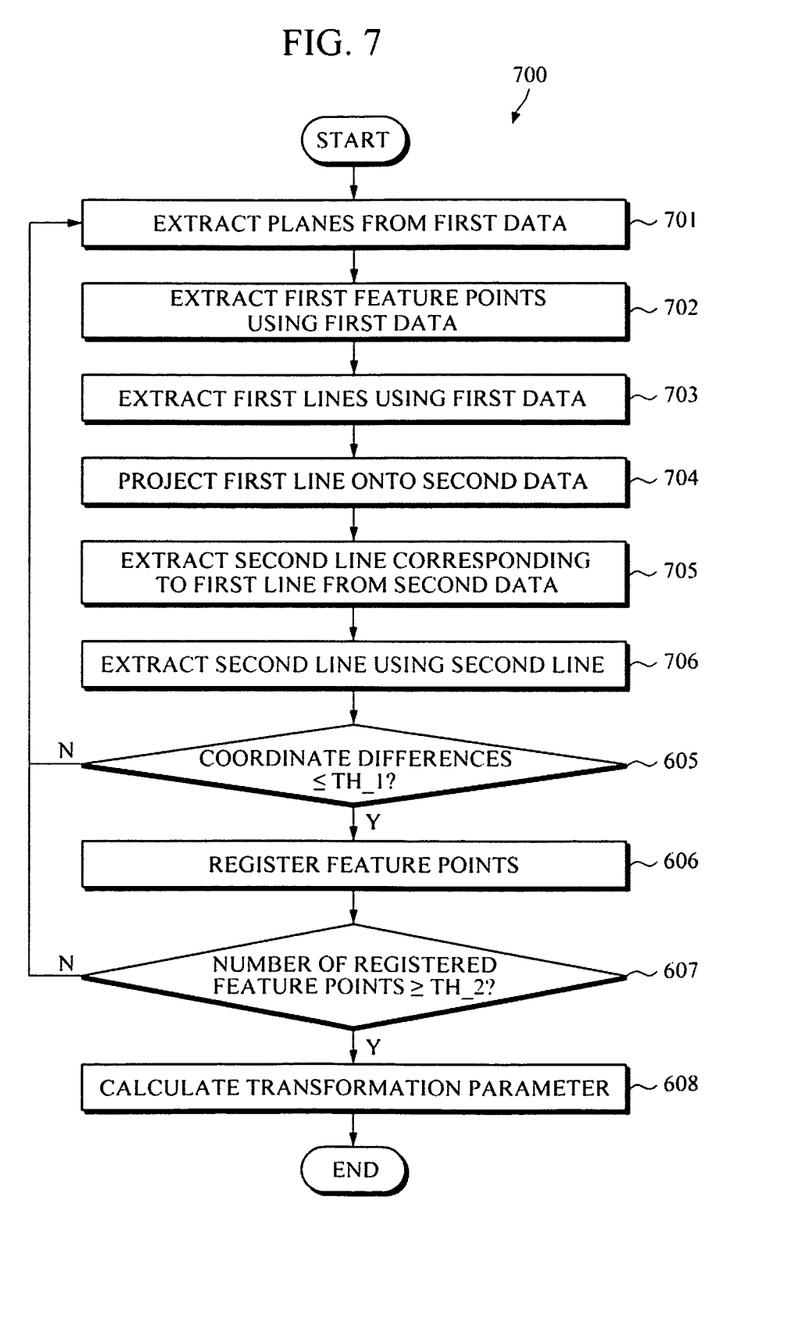
FIG. 7 is a flowchart illustrating another method with calibration, according to one or more embodiments.

FIG. 7 is a flowchart illustrating a method 700 with calibration, according to one or more embodiments.

Referring to FIG. 7, planes may be extracted from first data (701). For example, the plane extractor 303 (see FIG. 3) may apply a plane detection algorithm to range data, thus extracting a plurality of planes.

Then, a plurality of first feature points may be extracted using the extracted planes (702). For example, the first feature point extractor 401 (see FIG. 4) may extract a point at which three planes cross each other as a first feature point.

In addition, a plurality of first lines may be extracted using the extracted planes (703). For example, the first line extractor 402 (see FIG. 4) may extract a line along which two planes cross each other as a first line.

Then, the first line may be projected onto second data (704). For example, the second line extractor 403 (see FIG. 4) may project a first line of range data to image data.

Then, a second line corresponding to the first line may be extracted from second data (705). For example, the second line extractor 403 may apply a straight line detection algorithm to a part of the second data onto which the first line is projected, thus extracting a second line.

Then, a second feature point corresponding to the first feature point may be extracted using the second line (706). For example, the second feature point extractor 404 may extract a point at which three second lines cross each other as a second feature point.

Successively, each coordinate value of the first feature point may be compared to a coordinate value of the second feature point (605). When it is determined from the results of the comparison that a difference between the coordinate values of the first and second feature points is equal to or less than a first threshold value, the extracted first and second feature points are registered (606). Then, it may be determined whether the number of registered first and second feature points is equal to or greater than a second threshold value (607). If the number of first and second feature points is equal to or greater than the second threshold value, a coordinate transformation parameter may be calculated using the registered first and second feature points (608). Here, operations 605-608 may correspond to similar operations in FIG. 6, and are thus illustrated with like reference numbers.

Since the apparatus and method described above detect feature points based on planes from range data in image data and perform calibration based on the found feature points, it is possible to perform calibration immediately as necessary without having to utilize a separate device such as a rig.

In one or more embodiments, apparatus, system, and unit descriptions herein include one or more hardware processing elements. For example, each described unit may include one or more processing elements performing the described operation, desirable memory, and any desired hardware input/output transmission devices. Further, the term apparatus should be considered synonymous with elements of a physical system, not limited to a single enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), which executes (processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An apparatus, including one or more processing devices, the apparatus comprising:
   a plane extractor to extract, using at least one of the one or more processing devices, at least one plane from first data obtained by a first sensor;
   a first feature point extractor to extract, using at least one of the one or more processing devices, a first feature point from the first data based on the at least one plane;

a second feature point extractor to project, using at least one of the one or more processing devices, the first feature point onto second data obtained by a second sensor and to extract a second feature point corresponding to the first feature point from a part of the second data onto which the first feature point is projected; and a transformation parameter calculator to calculate, using at least one of the one or more processing devices, a coordinate transformation parameter between the first sensor and the second sensor using a difference between coordinate values of the first and second feature points.

2. The apparatus of claim 1, wherein the first sensor is a 3-dimensional (3D) distance sensor and the first data is 3D range data obtained from the 3D distance sensor.

3. The apparatus of claim 1, wherein the second sensor is an image sensor and the second data is image data obtained from the image sensor.

4. The apparatus of claim 1, wherein the first feature point extractor extracts a part at which at least three planes cross each other as the first feature point.

5. The apparatus of claim 1, wherein the transformation parameter calculator registers the first feature point and the second feature point when the difference between coordinate values of the first and second feature points is determined not to meet a first threshold, and calculates, when the number of the registered first and second feature points is determined to meet a second threshold, the coordinate transformation parameter using the registered first and second feature points.

6. An apparatus, including one or more processing devices, the apparatus comprising:
   a plane extractor to extract, using at least one or more processing devices, at least one plane from first data obtained by a first sensor;
   a first feature point extractor to extract, using at least one of the one or more processing devices, a first feature point from the first data based on the at least one plane;
   a first line extractor to extract, using at least one of the one or more processing devices, a first line from the first data based on the at least one plane;
   a second line extractor to project, using at least one of the one or more processing devices, the first line onto second data obtained by a second sensor and to extract a second line corresponding to the first line from a part of the second data onto which the first line is projected;
   a second feature point extractor to extract, using at least one of the one or more processing devices, a second feature point corresponding to the first feature point based on the second line; and
   a transformation parameter calculator to calculate, using at least one of the one or more processing devices, a coordinate transformation parameter between the first sensor and the second sensor using a difference between coordinate values of the first and second feature points.

7. The apparatus of claim 6, wherein the first sensor is a 3-dimensional (3D) distance sensor and the first data is 3D range data obtained from the 3D distance sensor.

8. The apparatus of claim 6, wherein the second sensor is an image sensor and the second data is image data obtained from the image sensor.

9. The apparatus of claim 6, wherein the first feature point extractor extracts a part at which at least three planes cross each other as the first feature point.

10. The apparatus of claim 6, wherein the first line extractor extracts a part at which at least two planes cross each other as the first feature point.

11. The apparatus of claim 6, wherein the transformation parameter calculator registers the first feature point and the second feature point when the difference between coordinate values of the first and second feature points is determined to not meet a first threshold, and calculates, when the number of the registered first and second feature points is determined to meet a second threshold, the coordinate transformation parameter using the registered first and second feature points.

12. A method, the method comprising:
   extracting at least one plane from first data obtained by a first sensor;
   extracting a first feature point from the first data based on the at least one plane;
   projecting the first feature point to second data obtained by a second sensor, and extracting a second feature point corresponding to the first feature point from a part of the second data to which the first feature point is projected; and
   calculating a coordinate transformation parameter between the first sensor and the second sensor using a difference between coordinate values of the first and second feature points.

13. The calibration method of claim 12, wherein the extracting of the first feature point comprises extracting a part at which at least three planes cross each other as the first feature point.

14. A calibration method of a composite sensor, comprising:
   extracting at least one plane from first data obtained by a first sensor;
   extracting a first feature point from the first data based on the at least one plane;
   projecting the first feature point to second data obtained by a second sensor, and extracting a second feature point corresponding to the first feature point from a part of the second data to which the first feature point is projected; and
   calculating a coordinate transformation parameter between the first sensor and the second sensor using the first feature point and the second feature point,
   wherein the calculating of the coordinate transformation parameter comprises:
   registering, when a difference between coordinate values of the first and second feature points is equal to or less than a first threshold value, the first feature point and the second feature point; and
   calculating, when the number of the registered first and second feature points is equal to or more than a second threshold value, the coordinate transformation parameter using the registered first feature point and the second feature point.

15. A method, the method comprising:
   extracting at least one plane from first data obtained by a first sensor;
   extracting a first feature point from the first data based on the at least one plane;
   extracting a first line from the first data based on the at least one plane;
   projecting the first line to second data obtained by a second sensor, and extracting a second line corresponding to the first line from a part of the second data to which the first line is projected;
   extracting a second feature point corresponding to the first feature point based on the second line; and
   calculating a coordinate transformation parameter between the first sensor and the second sensor using a difference between coordinate values of the first and second feature points.

16. The method of claim 15, wherein the extracting of the first feature point comprises extracting a part at which at least three planes cross each other as the first feature point.

17. The method of claim 15, wherein the extracting of the first line comprises extracting a line along which at least two planes cross each other as the first line.

18. The method of claim 15, wherein the calculating of the coordinate transformation parameter comprises:

registering the first feature point and the second feature point when the difference between coordinate values of the first feature points is equal to or less than a first threshold value; and calculating the coordinate transformation parameter using the registered first and second feature points when the number of the registered first and second feature points is equal to or more than a second threshold value.

19. The method of claim 12, wherein the calculating of the coordinate transformation parameter comprises:

registering, when the difference between coordinate values of the first and second feature points is determined to not meet a first threshold, the first feature point and the second feature point; and calculating, when the number of the registered first and second feature points is determined to meet a second threshold, the coordinate transformation parameter using the registered first feature point and the second feature point.

20. The method of claim 15, wherein the calculating of the coordinate transformation parameter comprises:

registering the first feature point and the second feature point when the difference between coordinate values of the first and second feature points is determined to not meet a first threshold; and calculating the coordinate transformation parameter using the registered first and second feature points when the number of the registered first and second feature points is determined to meet a second threshold.

* * * * *